Feb. 10, 1953  H. S. MADSEN  2,628,168
PROCESS FOR HEAT-TREATING CITRUS JUICES
Filed July 31, 1951
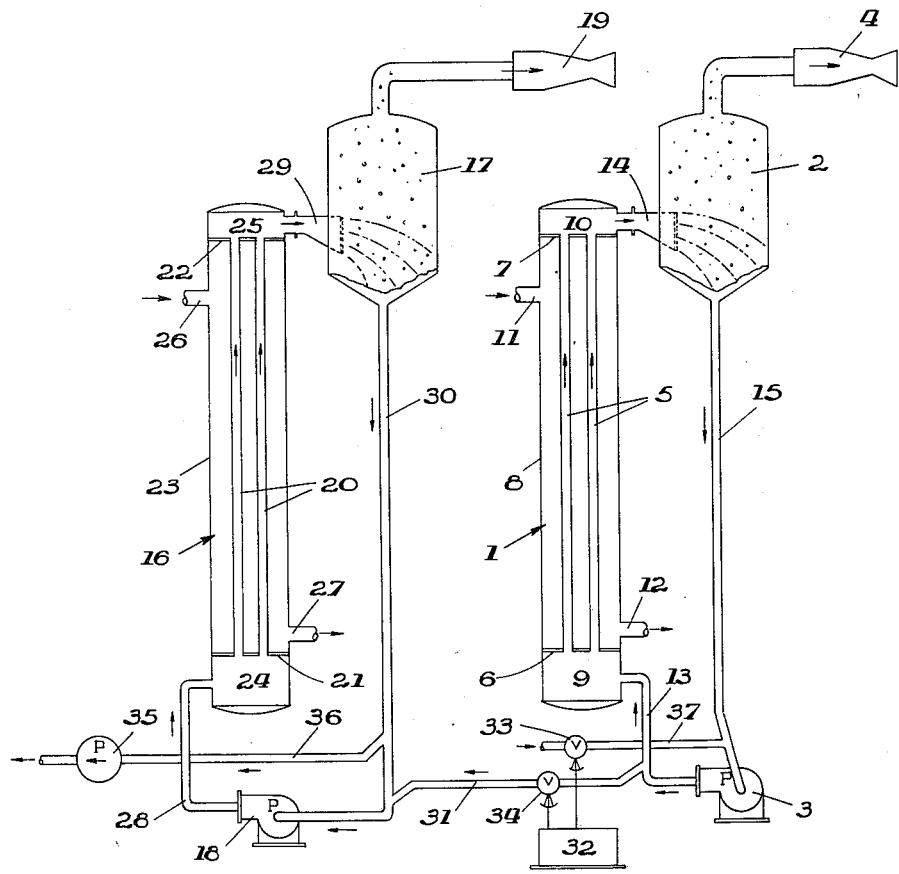
INVENTOR
*Herbert Stanford Madsen*
BY
*Cameron, Kerkam & Sutton*
ATTORNEYS Patented Feb. 10, 1953

2,628,168

UNITED STATES PATENT OFFICE 2,628,168

PROCESS FOR HEAT-TREATING CITRUS JUICES

Herbert Stanford Madsen, Lakeland, Fla., assignor to General Foods Corporation, New York, N. Y., a corporation of Delaware Application July 31, 1951, Serial No. 239,573

10 Claims. (Cl. 99—155)

The present invention relates to the processing of citrus juices, particularly to the inactivation of the enzyme content thereof.

Citrus puices, such as those extracted from oranges, grapefruit, tangerines, lemons, limes, and the like, contain various enzymes among which is a type of enzyme commonly referred to as pectinesterase. The main characteristic of the pectinesterase enzyme is its catalytic action resulting in the demethoxylation of the pectin content of the juice, thus rendering the pectin precipitable by various polyvalent metal ions, such as those of calcium, magnesium, iron, copper, and the like. Such precipitation in turn destroys the natural colloidal properties of the citrus juice so that a clear serum is developed and the normal cloudy appearance of fresh juice is not retained. Further, since the precipitated material cannot be resuspended satisfactorily, such juice can never again have the appearance, flavor and feel which is normally associated with fresh juice.

One way to provide for the proper preservation of citrus juices and prevent the above discussed loss of cloud is to completely inactivate the enzymes and microrganisms contained therein. On the other hand, it has always been appreciated that such complete inactivation could only be effected through the use of high pasteurization temperatures which heretofore have always entailed, to some degree, the development of various off-flavors usually described as cooked, bitter, oxidized, and the like. It is for this reason that the frozen citrus juice concentrates which have only recently appeared on the market have been prepared without any attempt to inactivate the enzyme content of the juice and have relied solely upon the immobilizing effect of extremely low temperatures to provide a suitable storage period for the concentrates. For example, under near perfect storage conditions of about 0° F., the storage life of the juice, as determined by the maintenance of the cloud in the subsequently reconstituted material, may be as long as two years. However, in going through the ordinary channels of commerce the frozen concentrated juice is frequently subjected, due to carelessness, unavoidable mechanical failures of refrigeration equipment, power failures, and the like, to temperatures considerably higher than the aforementioned near perfect storage temperature of 0° F. Such bad handling usually results in the activation of the enzyme content of the juice, particularly the pectinesterase, which results in the formation of a gel within the can with the result that the reconsituted juice does no have the aforementioned cloud necessary to the appearance of fresh juice. Moreover, the temperatures which prevail in the freezer compartment of the ordinary household refrigerator are generally no lower than about 17–18° F., far from the 0° F. mentioned above. It is easily seen then that the provision of a method for inactivating the enzyme content of the citrus juices while retaining their natural flavor, appearance and nutritive value is highly desirable.

It is an object of the present invention to inactivate, at least partially, the enzyme content of citrus juices without the development of cooked, oxidized, bitter and other off-flavors.

Another object of the present invention is the substantially complete inactivation of the pectinesterase contained in the citrus juices without the development of the aforemetnioned off-flavors.

Still another object of the invention is to prolong the period during which frozen concentrated citrus juices may be stored without undergoing appreciable deterioration.

A further object of the invention is to preserve those constituents responsible for cloud formation so that upon reconstitution of the frozen concentrated citrus juice stable cloud formation will be provided.

A still further object of the invention is to effect the aforementioned inactivation of the enzymes simultaneously with the process of concentrating the citrus juice.

These and other objects will be apparent from the discussion that follows hereinafter.

It has now been found that at least the partial inactivation of the enzymes, particularly the pectinesterase, naturally occurring in a citrus juice may be effected without the development of the aforementioned off-flavors by circulating said juice under an absolute pressure of less than 50 mm. of mercury through a heat exchanger maintained in a filled condition and having a heating surface temperature within the range of about 140°–195° F. provided that the juice is circulated at a velocity below that at which turbulent flow would result so that a film of said juice is formed at the heating surface, said film being disrupted by the ebullition of water vapor from said surface and a new film immediately thereafter being formed to subject continuously a succession of fresh juice surface to thermal exposure. Moreover, it has been found that this process may be conveniently carried out simultaneously with the process of concentrating a citrus juice in connection with the preparation of a frozen citrus juice concentrate.

As is evident from the foregoing, in carrying out the process of the present invention, the juice must be circulated through a heat exchanger under carefully controlled conditions of juice velocity, heating surface temperature, reduced pressure, apparatus design, and the like. As will be explained more fully hereinafter, the process of the present invention successively subjects small portions of the juice to relatively high temperatures for the purpose of inactivation and immediately thereafter cools the same to a relatively low temperature, and for this reason it is necessary that a high temperature gradient be maintained between the juice at the heating surface of the heat exchanger and the bulk of the juice flowing therethrough. In order to maintain such a high temperature gradient, the circulation of the juice through the heat exchanger should be carried out using a velocity which would ordinarily provide laminar flow. If the juice were circulated at a sufficiently high velocity so that turbulent flow would result, the present process would not be operative since, under such conditions, it would be impossible to maintain the high temperature gradient and, further, such turbulent flow would prematurely strip the film of juice away from the surface of the heat exchanger before the proper degree of inactivation could be obtained.

The aforementioned laminar flow is not, however, the entire answer to the problem of inactivating the enzyme content of the juice without also imparting a cooked flavor thereto and its use without controlling the other aforementioned conditions would result in the development of a cooked flavor due to the fact that the film of the juice at the heating surface would be subjected to the high temperature thereof for excessive lengths of time. Consequently, it is necessary to provide some means other than that which would be provided by turbulent flow for disrupting said film and replacing the same with a new film composed of another small portion of the juice. In this respect, it has been found that the provision of ebullition or the formation of water vapors at the heating surface meets this requirement. As the water vapor bubble is formed, it not only strips the heating surface of the film of juice so that a new film of juice is in turn subjected to the inactivation temperature, but it also returns the juice which comprised the disrupted film to the interior of the juice stream or column so that the same is rapidly cooled to the low bulk temperature at which cooked flavors cannot be developed.

It is the essential discovery, therefore, upon which the success of the process of the present invention depends, that it is possible to maintain a relationship between the linear velocity with which the juice passes through the heat exchanger, the temperature at which the heating surface is maintained, and the reduced pressure at which the juice is circulated through the heat exchanger so that inactivation can be effected without the development of cooked or other off-flavors. The juice is circulated through the heat exchanger at such a velocity that a film is formed on the heating surface. The heating surface is, in turn, maintained at a sufficiently high temperature so as to not only effect the desired inactivation but also, in conjunction with the reduced pressure at which the juice is maintained, to cause a sufficiently rapid degree or rate of ebullition thereby causing the film formed at the heating surface to become disrupted and rapidly cooled to the low bulk temperature of the juice. It is to be appreciated, of course, that the use of higher juice circulation velocities would result in a more readily disrupted film. However, as explained hereinbefore, to use the same would not provide the same degree of inactivation or the same rapid cooling of the juice portions after they have been subjected to the inactivation temperatures even though such use would provide the same degree of ebullition as is obtained with the lower velocities. On the other hand, the velocity of the juice through the heat exchanger should be sufficient to aid in the return of the juice composing the disrupted film to the bulk of the juice so that such disrupted film is not maintained at its high temperature for a length of time sufficient to develop cooked or other off-flavors.

In order to obtain a sufficient degree of ebullition without at the same time imparting a cooked, oxidized, or other off-flavor, it has been found that the juice should be maintained under a reduced pressure of about 50 mm. of mercury absolute or below, while at the same time subjecting the juice to a heating surface temperature of about 140°–195° F. Since the heating surface temperature is far in excess of that required to vaporize water from the juice under the prevailing pressure, ebullition or the formation of vapor at the heating surface is very rapid with the result that the film of juice adjacent the heating surface is disrupted and that portion of the juice constituting the same is returned to the bulk of the juice where it is immediately cooled to the bulk juice temperature. Immediately after the film is disrupted by ebullition, a new film is formed at the heating surface and a new portion of the juice is subjected to the inactivation temperature. In this manner, the process of forming a film of juice which is inactivated, returned to the bulk of the juice by the ebullition and immediately replaced by a fresh film of juice is repeated along the surface of the heat exchanger as the juice passes therethrough.

As indicated above, the temperature at the heating surface should be within the range of about 140°–195° F. This temperature should be maintained not only for the purpose of effecting the desired degree of inactivation but also for the purpose of providing the desired degree of ebullition. As aforementioned, the latter is relied upon to a very large extent to prevent the development of cooked flavors by providing for the prompt removal of the different portions of juice from the heating surface shortly after they have been heated to the temperature required for inactivation. It is recognized that the temperature obtained by the juice is virtually never as high as that provided at the heating surface because, of course, when the juice constituting the film reaches a temperature in excess of that in equilibrium with the pressure under which the system is maintained ebullition occurs with the resultant stripping of the juice film from the heating surface. However, there is no doubt that for a very short time some portions of the juice film attain a temperature in excess of this equilibrium temperature. While the temperature of 140°–195° F. offers a range of empirically determined operating conditions, it is not intended to indicate the same as being the temperature at which the inactivation is effected. Experiment has shown that operating in accordance with the practice of the present invention at temperatures appreciably below 140° F. fails to provide satisfactory inactivation while, on the other hand, operating with heating surface temperatures appreciably in excess of 195° F. will result in the development of the aforementioned undesirable cooked flavor. Moreover, it has also been found that operating at heating surface temperature within the range of 170°–195° F. is preferable from the standpoint of inactivation, flavor and economy of operation and equipment design.

As indicated above, the juice must be maintained under an absolute pressure of less than 50 mm. of mercury. Such a low pressure must be provided in order to insure an adequate degree of ebullition so that the film which is formed at the heating surface will be shortly thereafter broken up with the return of the juice constituting said film to the bulk of the juice being processed. Also, such a low pressure is required to maintain the bulk of the juice at a sufficiently low temperature which, under the conditions of the present invention is never more than about 100° F. and is usually about 70°–80° F., so that that portion of the juice which constituted the film may be rapidly cooled to a sufficiently low temperature so as to avoid the development of a cooked flavor. Still further, the provision of such a low pressure will, to some extent, provide for the removal of dissolved air or oxygen which, if allowed to remain during the entire heat treatment, would tend to promote the development of cooked, oxidized, and other off-flavors. Although the upper limit of pressure has been indicated above as being about 50 mm. of mercury, nevertheless, it is preferred from the standpoint of efficient operation to use an absolute pressure of the order of 25 mm. of mercury.

It is also required that in carrying out the process of the present invention the heat exchanger employed be maintained in a filled condition as opposed to an arrangement which provides the so-called "falling film." This is required in order to provide, adjacent to the film of juice which is being subjected to the inactivation temperature, a large volume or bulk of juice which is maintained at a relatively low temperature. Since the bulk of the juice is at a relatively low temperature, when the portion of juice constituting the film is removed from the heating surface it is immediately blended with the larger volume of juice at the lower temperature with resultant rapid cooling. Moreover, by operating the heat exchanger in such a filled condition, the linear velocity of the juice being circulated through the heat exchanger may be more readily controlled which is important from the standpoint of providing for film formation of the desired nature and avoiding the turbulent flow of the juice through the heat exchanger.

The maximum temperature to which the juice in tubes of the heat exchanger is heated in the course of its passage therethrough is also an important factor to be controlled in accordance with the process of the invention. Experiment has shown that as the bulk temperature is increased, the degree of inactivation is accordingly increased, the limiting temperature to which the bulk of the juice can be raised being that at which the development of off-flavors begins to occur. Other factors remaining constant the bulk juice temperature will be controlled by the residence time of the juice in the tubes which, in turn, is controlled by the internal diameter and length of the tube. In the case of tubes of the usual internal diameter employed in the commercial processing of food materials, namely 1¼ to 2 inches, it has been found that the length of the tube should be within the range of about 6–14 feet.

In accordance with the process of the present invention, it has been found that up to 75% or more of the enzyme content, particularly the pectinesterase, of citrus juices can be inactivated without occasioning the development of off-flavors. Moreover, as mentioned hereinbefore, and as shown in the following example such inactivation can be effected simultaneously with the preparation of a citrus juice concentrate without occasioning the use of special apparatus or equipment provided that the juice velocity, heating surface temperature, reduced pressure and full-flow conditions of the heat exchanger can be maintained in accordance with the above-described conditions.

Referring to the apparatus shown in the drawing, in which the concentration of the citrus juice is in two stages; i. e., from 11° to 18° Brix in a first stage circulation system and from 18° Brix to 55° Brix in a second stage circulation system, respectively; the inactivation mentioned above can be effected in either one or both of the two stages of the apparatus. However, from the standpoint of maximum operating efficiency it is preferred that in operating the particular installation described in detail hereinafter, the inactivation be effected almost entirely in the second stage of the apparatus. As shown in the drawings, the first and second stage circulation systems include heat exchangers 1, 16, evaporator-separators 2, 17, circulation pumps 3, 18, and steam ejectors 4, 19. The heat exchangers are of the shell and tube type and include a nest of 64 upright tubes 5, 20, which are 8¼ ft. in length and have an internal diameter of 1¼ in., the cross sectional open area of the tubes being equal to 0.307 sq. ft. and the total internal surface area of the tubes being equal to 97.2 sq. ft. The tubes 5, 20 pierce, at their opposite ends, diaphragms 6, 7 and 21, 22, which are located toward the ends of the shells 8, 23, leaving the entrance compartments 9, 24 for the juice, and outlet compartments 10, 25 for the juice and vapor. Steam or other heating media is admitted to the nest of tubes 5, 20 through inlet pipes 11, 26 which communicate with the shells 8, 23 at a point just below the upper diaphragms 7, 22 and escapes through pipes 12, 27, located just above the lower diaphragms 6, 21. The steam or heating media thus admitted fills the space around the tubes and heats them to the desired temperature. The juice enters the entrance compartments 9, 24 through pipes 13, 28, which are connected to the output side of pumps 3, 18, and flows upward through the tubes. By means of the steam ejectors 4, 19, both the first and second stage circulation systems are maintained under a reduced pressure of about 26 mm. mercury absolute. As the juice passes through the tubes 5, 20, part of the juice is vaporized, which vapor travels along with the juice into the receiving compartments 10, 25 where the juice and vapor are discharged or "flashed" into the evaporator-separators 2, 17, through conduits 14, 29. In the evaporator-separators 2, 17, the vapor is separated from the liquid juice and exhausted from the systems by means of the ejectors 4, 19. The liquid juice which has been cooled by the flash evaporation and vapor separation then flows through pipes 15, 30, to the pumps 3, 18, to be recirculated to the heat exchangers of respective systems.

The juice in the first stage circulation system is maintained at about 18° Brix by the addition of fresh juice, usually of about 11° Brix, to the circulation system through pipe 37 which is connected to pipe 15 at a point above the pump 3, and by the removal of the juice from the system through pipe 31, which is connected to pipe 13. The addition of fresh juice and the removal of juice of 18° Brix is controlled by a density controller 32 which regulates bleeder valves 33, 34, located in pipes 37, 31, respectively. The juice in the second stage circulation system is maintained at about 55° Brix by the addition of 18° Brix juice to the circulation system through pipe 31 which is connected to pipe 30 at a point prior to the circulation pump 18, and the removal of concentrated juice of 58° Brix by means of a discharge pump 35, connected by means of pipe 36 to pipe 30 at a point above the connection between pipe 30 and pipe 31, at which juice of 18° Brix is added to the circulation system.

In the first stage circulation system, the tubes 5 are maintained at a temperature of about 210° F. by the addition of steam or other heating medium to the steam chest 8 and the pump 3 circulates approximately 600 gallons of juice per minute through the heat exchanger 1. In flowing through the heat exchanger, the bulk temperature of the juice is raised from about 80° F. to about 88° F., which latter temperature is slightly below that temperature at which, in view of the reduced pressure at which the juice is maintained, the mass of the juice would begin to boil. When the juice is then flashed into the evaporator-separator 2, evaporation reduces the bulk juice temperature to about 80° F. and the juice is then recirculated back through the heat exchanger 1.

As mentioned above, the juice is circulated through the heat exchanger 1 at the rate of 600 gallons per minute which, in view of the tube dimensions, juice density, and the like, is sufficient to cause a highly turbulent flow through the tubes 5. In view of the turbulent flow conditions, there is substantially no temperature gradient between the juice at the heating surfaces of the tubes 5 and the bulk of the juice flowing therethrough since under such flow conditions the juice is immediately stripped away from the tube surfaces and such juice does not remain in contact with the surfaces for a length of time sufficient to increase its temperature to much above the bulk temperatures of the juice, 80°–88° F. As a result of the foregoing substantially no inactivation of the enzymes will be effected.

In the second stage circulation system, the tubes 20 are maintained at about 190° F. by the addition of steam or other heating medium to the steam chest 23. The pump 18 circulates the juice through the tubes at approximately 300 gallons per minute, which, in view of the tube dimensions, juice density, and the like, results in a juice velocity through the tubes 20 slightly below that which would result in turbulent flow conditions. As a result, there is laminar flow of the juice through the tubes 20 and a temperature gradient is maintained between the juice adjacent the heating surfaces of the tubes and the bulk of the juice flowing therethrough. As in the first stage circulation system, in flowing through the heat exchange 16, the bulk temperature of the juice is raised from about 80° F. to about 88° F. and, when flashed into the evaporator-separator 17, evaporation reduces the bulk juice temperature to about 80° F. prior to the recirculation of the juice back through the heat exchanger 16.

Since, as mentioned above, a temperature gradient is maintained between the juice adjacent the heating surfaces of the tubes 20 and the bulk of the juice flowing therethrough, and in view of the reduced pressure at which the juice is maintained, as the temperature of the film of juice adjacent to the heating surfaces increases, ebullition or the formation of vapor occurs with the result that the film of juice is immediately disrupted and that portion of the juice constituting the same is returned to the bulk of the juice where it is cooled to the bulk juice temperature. Such film formation and subsequent disruption of the film by ebullition occurs along substantially the entire length of the tubes 20. However, in view of the particular design of the heat exchanger there may be a tendency for an increased rate of ebullition near the tops of the tubes. This is due to the fact that the bulk temperature of the juice flowing through the tubes 20 increases from about 80° F. to about 88° F. as the juice flows therethrough and to the fact that the juice pressure at the top of the tubes is slightly less than the juice pressure at the bottom of the tubes or inlet side because of the pressure head caused by the juice therein. As a result, it would under the laminar flow conditions, take less time to heat the films of juice at the tops of the tubes to that temperature which would result in ebullition for the corresponding juice pressures.

In the second stage circulation system, while the films of juice adjacent the heat exchange surfaces of the tubes 20 probably do not reach a temperature as high as that provided by the heating surface because of the fact that when the film reaches a temperature in excess of that in equilibrium with the pressure under which the juice is maintained, ebullition occurs, it is believed that for a very short time some portions of the juice film attain a temperature in excess of this equilibrium temperature with the result that there is inactivation of the enzymes. This has been experimentally determined to be true in view of the fact that under the temperatures and juice velocity conditions of the second stage circulation system as set forth above, more than 75% of the enzymes, particularly to the pectinesterase, are inactivated.

The method of determining the pectinesterase content of both raw fresh juice and juice which had been processed according to the process of the present invention was similar to the method developed by L. R. MacDonnell, Eugene F. Jansen and Hans Lineweaver as described in their article entitled "The Properties of Orange Pectinesterase" appearing in the May 1945 issue of Archives of Biochemistry, vol. 6, No. 3, pages 389–401. Since pectinesterase catalyzes the hydrolytic removal of methyl alcohol from the pectin molecule leaving free carboxyl groups, the activity of the naturally occurring pectinesterase in the citrus juice can be determined by measuring the rate of formation of acid (COOH groups) in the following manner. To 20 ml. of juice in a 150 ml. beaker, there is added 2 N NaOH dropwise until a slightly pink color with phenolphthalein develops and to such neutralized juice there is then added 40 ml. of 1% pectin solution containing NaCl. The beaker should then immediately be placed in a constant temperature bath at 30° C. and the pH adjusted to pH 7.5 ± 0.3 with 0.05 N NaOH. The rate of liberation of acid groups can then be measured by titration with 0.05 N NaOH pH 7.5 ± 0.3. The 0.05 NaOH is added in increments of 1 to 2 ml. depending upon the activity of the pectinesterase in the juice and the time required for the reaction mixture to return to the original pH is recorded. The procedure is repeated over a period of 10–15 minutes with 4–6 readings of time and alkali being made. The results are expressed in pectinesterase units in accordance with the following formula wherein the symbol (P.E.u) ml. represents the milliequivalents of ester hydrolyzed per minute per ml. of juice under the above conditions.

$$(\text{P.E.u}) \text{ ml.} = \frac{\text{ml. N NaOH}}{\text{ml. juice} \times \text{time (minutes)}}$$

As expressed by the above formula, fresh juice having a $20.8 \times 10^{-4}$ (P.E.u) ml. value, when concentrated to 55° Brix and simultaneously inactivated in the second stage steam chest of the second stage circulation system under the conditions described in the foregoing example, was found to have a pectinesterase content of $5.0 \times 10^{-4}$ (P.E.u) ml. Moreover, such juice when stored at 17°–18° F. was found to have a storage life, as determined by the maintenance of the cloud, of over two years as compared to a storage life of about two to three months for juice of the same degree Brix in which the pectinesterase had not been inactivated. Likewise, such juice when stored at 45° F. was found to have a storage life of from 12 to 16 months as compared to a storage life of about two weeks for non-inactivated juice of the same degree Brix.

As is seen from the foregoing, the present invention provides a process for inactivating the enzyme content of citrus juices, particularly the pectinesterase, without the development of the various aforementioned off-flavors with the result that the period for which the product may be stored is considerably prolonged and the general quality of the product as used by the housewife is consequently greatly improved.

While the invention has been described with respect to a specific example and operating details, it is to be understood that the invention is not restricted thereto and that the scope of the present invention is to be determined solely by reference to the appended claims.

What is claimed is:

1. A process for effecting at least the partial inactivation of the enzymes naturally occurring in a citrus juice which are responsible for the loss of cloud and formation of a gel which comprises circulating said juice under an absolute pressure of less than 50 mm. of mercury through a heat exchanger maintained in a filled condition and having a heating surface temperature within the range of about 140°–195° F., said juice being circulated at a velocity below that at which turbulent flow would be provided so that a film of said juice is formed at the heating surface, said film being disrupted by the ebullition of water vapor from said surface and a film immediately thereafter being formed to subject continuously a succession of fresh juice surfaces to thermal exposure.

2. A process for effecting at least the partial inactivation of the enzymes naturally occurring in a citrus juice which are responsible for the loss of cloud and formation of a gel which comprises circulating said juice under an absolute pressure of less than 50 mm. of mercury through a heat exchanger maintained in a filled condition and having a heating surface temperature within the range of about 170°–195° F., said juice being circulated at a velocity below that at which turbulent flow would be provided so that a film of said juice is formed at the heating surface, said film being disrupted by the ebullition of water vapor from said surface and a film immediately thereafter being formed to subject continuously a succession of fresh juice surfaces to thermal exposure.

3. A process for effecting at least the partial inactivation of the enzymes naturally occurring in a citrus juice which are responsible for the loss of cloud and formation of a gel which comprises circulating said juice under an absolute pressure of about 25 mm. of mercury through a heat exchanger maintained in a filled condition and having a heating surface temperature within the range of about 170°–195° F., said juice circulated at a velocity below that at which turbulent flow would be provided so that a film of said juice is formed at the heating surface, said film being disrupted by the ebullition of water vapor from said surface and a film immediately thereafter being reformed to subject continuously a succession of fresh juice surfaces to thermal exposure.

4. The process according to claim 1 wherein the juice is circulated under the prescribed conditions for a time sufficient that at least 75% of the enzymes responsible for the loss of cloud and formation of a gel in the citrus juice are inactivated.

5. The process according to claim 10 wherein the juice is circulated under the prescribed conditions for a time sufficient that at least 75% of the enzymes responsible for the loss of cloud and formation of a gel in the juice are inactivated.

6. The process according to claim 10 wherein the juice is circulated under the prescribed conditions for a time sufficient that the pectinesterase naturally occurring in the orange juice is reduced to a value below $5 \times 10^{-4}$ P. E. u.

7. In the process of concentrating orange juice, the steps comprising circulating said juice under an absolute pressure of less than 50 mm. of mercury through a heat exchanger maintained in a filled condition and having a heating surface temperature within the range of about 140°–195° F., said juice being circulated at a velocity below that at which turbulent flow would be provided so that a film of said juice is formed at the heating surface, said film being disrupted by the ebullition of water vapor from said surface and a film immediately thereafter being reformed to subject continuously a succession of fresh juice surfaces to thermal exposure, whereby at least a partial inactivation of the enzymes naturally occurring in the juice responsible for the loss of cloud and formation of a gel is effected.

8. In the process of concentrating orange juice, the steps comprising circulating said juice under an absolute pressure of less than 25 mm. of mercury through a heat exchanger maintained in a filled condition and having a heating surface temperature within the range of about 140°–195° F., said juice being circulated at a velocity below that at which turbulent flow would be provided so that a film of said juice is formed at the heating surface, said film being disrupted by the ebullition of water vapor from said surface and a film immediately thereafter being reformed to subject continuously a succession of fresh juice surfaces to thermal exposure, whereby at least 75% of the enzymes naturally occurring in the juice responsible for the loss of cloud and formation of a gel are inactivated.

9. In the process of concentrating orange juice, the steps comprising circulating said juice under an absolute pressure of less than 25 mm. of mercury through a heat exchanger maintained in a filled condition and having a heating surface temperature within the range of about 170°–195° F., said juice being circulated at a velocity below that at which turbulent flow would be provided so that a film of said juice is formed at the heating surface, said film being disrupted by the ebullition of water vapor from said surface and a film immediately thereafter being formed to subject continuously a succession of fresh juice surfaces to thermal exposure, whereby the pectinesterase is inactivated at least to a value of 5 P. E. u.

10. The process according to claim 7 wherein the orange juice flows through the heat exchanger in a vertical direction forming a column of from about 1¼ to about 2 inches in diameter and from about 6 to about 14 feet in height.

HERBERT STANFORD MADSEN.

REFERENCES CITED

The following references are of record in the file of this patent:

UNITED STATES PATENTS

| Number | Name | Date |
|---|---|---|
| 1,838,517 | Smalle | Dec. 29, 1931 |
| 1,989,399 | Browne | Jan. 29, 1935 |
| 2,217,261 | Stevens | Oct. 8, 1940 |